United States Patent
Slavin, III et al.

(10) Patent No.: US 9,378,582 B2
(45) Date of Patent: Jun. 28, 2016

(54) RENDERING OF DESIGN DATA

(75) Inventors: Edward Slavin, III, Ewing, NJ (US); Jan Ernst, Plainsboro, NJ (US); Yakup Genc, Dayton, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 647 days.

(21) Appl. No.: 13/562,448

(22) Filed: Jul. 31, 2012

(65) Prior Publication Data

US 2014/0035900 A1 Feb. 6, 2014

(51) Int. Cl.
*G06T 15/00* (2011.01)
*G06T 15/20* (2011.01)
*G06T 19/00* (2011.01)
*G06T 9/00* (2006.01)

(52) U.S. Cl.
CPC ............. *G06T 15/20* (2013.01); *G06T 9/001* (2013.01); *G06T 9/004* (2013.01); *G06T 19/00* (2013.01); *G06T 2210/08* (2013.01)

(58) Field of Classification Search
CPC .............. G06T 19/00; G06T 15/00; G06T 2207/20182; G06T 5/002; G06T 15/20; G06T 2210/08
USPC .......................................... 345/419, 427, 505
See application file for complete search history.

(56) References Cited

U.S. PATENT DOCUMENTS

| 6,570,585 | B1 * | 5/2003 | Hines ............... H04N 21/23412 345/473 |
| 7,616,807 | B2 | 11/2009 | Zhang et al. |
| 2004/0010621 | A1 * | 1/2004 | Afergan et al. ............. 709/247 |
| 2005/0049495 | A1 | 3/2005 | Sumanaweera et al. |
| 2005/0052688 | A1 * | 3/2005 | Maruyama ................. 358/1.15 |
| 2006/0129361 | A1 * | 6/2006 | Miura et al. .................... 703/2 |
| 2010/0045662 | A1 * | 2/2010 | Boothroyd et al. .......... 345/419 |
| 2012/0084350 | A1 * | 4/2012 | Xie ............................. 709/203 |
| 2013/0257856 | A1 * | 10/2013 | Hickman et al. ............ 345/419 |

OTHER PUBLICATIONS

N. Ralph, "AMD's 'Fusion' Could Power Cloud-Computer Gaming," webpage, http://www.wired.com/gamelife/2009/01/amd-supercomput/, pp. 1-5, Jul. 10, 2012.
NVIDIA, "NVIDIA Reality Server Propels 3D Cloud Computing Using GPUs," webpage, http://www.nvidia.com/object/io_1256065754359.html, pp. 1-3, Jul. 10, 2012.

(Continued)

*Primary Examiner* — Ke Xiao
*Assistant Examiner* — Kim-Thanh T Tran (57) ABSTRACT

Computer assisted design data is rendered in the cloud. A client-server relationship is provided for 3D rendering. To reduce the burden on the server, the 3D rendering adapts based on the client capabilities. Where possible, some of the 3D rendering is performed by the server and some by the client machine. The 3D rendering by the client machine may be limited to avoid transfer of geometrical data of the CAD data. Different textures or shaders are used for rendering images associated with motion. Dictionary information is accumulated by the client machine to reduce the number of coefficients later transferred to the client machine for 3D rendering. The model represented by the CAD data is used to predict rendered images so that video compression may be performed. The server sparsely renders an image and compressive sensing is used by the client machine to generate the complete image.

14 Claims, 7 Drawing Sheets

(56) References Cited

OTHER PUBLICATIONS

"Gaikai," webpage, Wikipedia, http://en.wikipedia.org/wiki/Gaikai, pp. 1-7, Jul. 10, 2012.

"Cloud gaming," webpage, Wikipedia, http://en.wikipedia.org/wiki/Cloud_gaming, pp. 1-4, Jul. 10, 2012.

"OnLive," webpage, Wikipedia, http://en.wikipedia.org/wiki/OnLive, pp. 1-11, Jul. 10, 2012.

* cited by examiner

RENDERING OF DESIGN DATA

BACKGROUND

The present embodiments relate to three-dimensional (3D) rendering. In particular, computer assisted design (CAD) data is rendered.

Traditionally, 3D rendering requires powerful machines equipped with high-end graphics cards to visualize creations. 3D content is being used in more business-oriented applications where the typical user's machine is magnitudes less powerful.

Visualization and interaction for rendering CAD data relies on the CAD data being available on the local machine, either locally stored on the machine or completely downloaded to the local machine. Once downloaded, the local client is responsible for all rendering and most of the logic associated with the data. The server does no rendering, instead only serving the CAD data to the client. As a result, the CAD data is rendered with different experiences due to differences in the capabilities of the local machine.

For everyone to have similar 3D experiences regardless of the capabilities of their local hardware, rendering is performed by a server, and the rendered content is streamed to the client. In general, it is prohibitively expensive to maintain a 1:1 ratio between client and server, so a server multiplexes requests from multiple clients to generate the rendered data for each. The challenge lies in maintaining interactive frame rates while enduring the thrashing that occurs when different data is required for rendering for the different clients.

BRIEF SUMMARY

The present invention is defined by the following claims, and nothing in this section should be taken as a limitation on those claims. By way of introduction, the preferred embodiments described below include methods, computer readable media, instructions, and systems for rendering of computer assisted design data. A client-server relationship is provided for 3D rendering from CAD data. To reduce the burden on the server, the 3D rendering adapts based on the client capabilities. Where possible, some of the 3D rendering is performed by the server and some by the client machine. The 3D rendering by the client machine may be limited to avoid transfer of geometrical data of the CAD data. Other processes alternatively or additionally reduce the burden on the server or network. For example, different textures or shaders are used for rendering images associated with motion. As another example, dictionary information is accumulated by the client machine to reduce the number of coefficients later transferred to the client machine for 3D rendering. In another example, the model represented by the CAD data is used to predict rendered images so that video compression on a rendered image may be performed. In yet another example, the server sparsely renders an image and compressive sensing is used by the client machine to generate the complete image.

In a first aspect, a method is provided for adaptive rendering of computer assisted design data. The computer assisted design data representing a three-dimensional structure is stored in a memory remote from a client computer. A server remote from a client computer renders a view of the three-dimensional structure using the computer assisted design data. The view is transmitted to the client computer. The rendering by the server adapts as a function of bandwidth, capability of the client computer, or both the bandwidth and the capability of the client computer. The adapting includes selecting between rendering the view as an image solely by the server and rendering the image in combination by the server and the client computer.

In a second aspect, a method is provided for rendering of computer assisted design data. A server renders a first image from the computer assisted design data. The rendering is of a sub-set based on maximally incoherent sampling of the computer assisted design data. A client computer receives the first image. The client computer constructs a second image with compressive sensing.

In a third aspect, a non-transitory computer readable storage medium has stored therein data representing instructions executable by a programmed processor for rendering of computer assisted design data. The storage medium includes instructions for predicting change from a rendered image based on a model represented by the computer assisted design data, rendering the model as a function of the change, and compressing the rendered image as a function of the rendered model.

In a fourth aspect, a method is provided for rendering of computer assisted design data. The computer assisted design data representing a three-dimensional structure is stored in a database remote from a client computer. A server remote from the client computer renders a sequence of images of the three-dimensional structure using the computer assisted design data. A level of detail of the images varies within the sequence based on motion of a viewpoint. The level of detail is associated with texture detail, shading, or texture detail and shading. The images of the sequence are transmitted to the client computer.

Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Data in the cloud is visualized. Multiple clients may visualize 3D data at the same time. Server resources aggregately present a set of GPU capabilities used to remotely render a particular visualization requested by a client or set of clients. The number of clients is greater than the number of servers within the cloud that provide the desired rendering capabilities, yet interactivity between the client and the served content is maintained. The resulting images are streamed to the clients and continuously updated based on the clients' actions. Multiple clients visualize complex CAD models that do not exist locally and interact with those models even when all data is not available locally. The clients may interact with the model data through a set of services that exist in the cloud (e.g. PMI, measurement, etc.) rather than perform these operations locally.

CAD data is not needed locally to perform non-engineering tasks, such as design reviews. A business or user (i.e., viewer) without the higher-end capabilities available to a designer may avoid a large and complex installation to view the CAD model. High-end visualization may be provided even on lower end devices. The server-based rendering allows capability stratification across different kinds of devices. To reduce server load, the rendering and streaming are scaled to address the needs of different types of clients (e.g. low memory, small form factor, etc.). A service-oriented view of the model may open up the possibility of different business models.

To visualize arbitrary 3D content, a set of techniques may be used either independently or together to reduce the latency observed by a client with respect to a remotely rendered image. The techniques may allow for a no-install visualization solution with limited requirements on the client side by streaming rendered images of CAD data to the client, while even allowing interaction while streaming. Other clients may include installation of visualization solutions to assist with the rendering. The system secures the CAD data by never downloading the CAD data to the client. Remote live changes in a collaborative setting may be propagated seamlessly, incrementally, and without user intervention.

Figure 1:
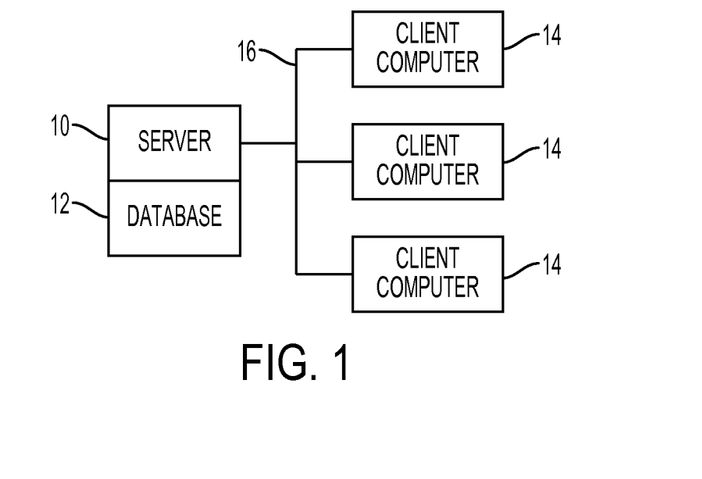
FIG. 1 is a block diagram of one embodiment of a system for client-server 3D rendering of CAD data.

FIG. 1 shows a system for 3D rendering of CAD data. The system includes a server 10, a database 12, client computers 14, and a network 16. Additional, different or fewer components may be provided. For example, more than one server 10 is provided. The database 12 is shown local to the sever 12, but may be remote from the server. More than one database 12 may be provided for interacting with any number of servers 10 exclusively or on a shared basis. Different networks may be used to connect different client computers 14 to the server 10.

Figure 2:
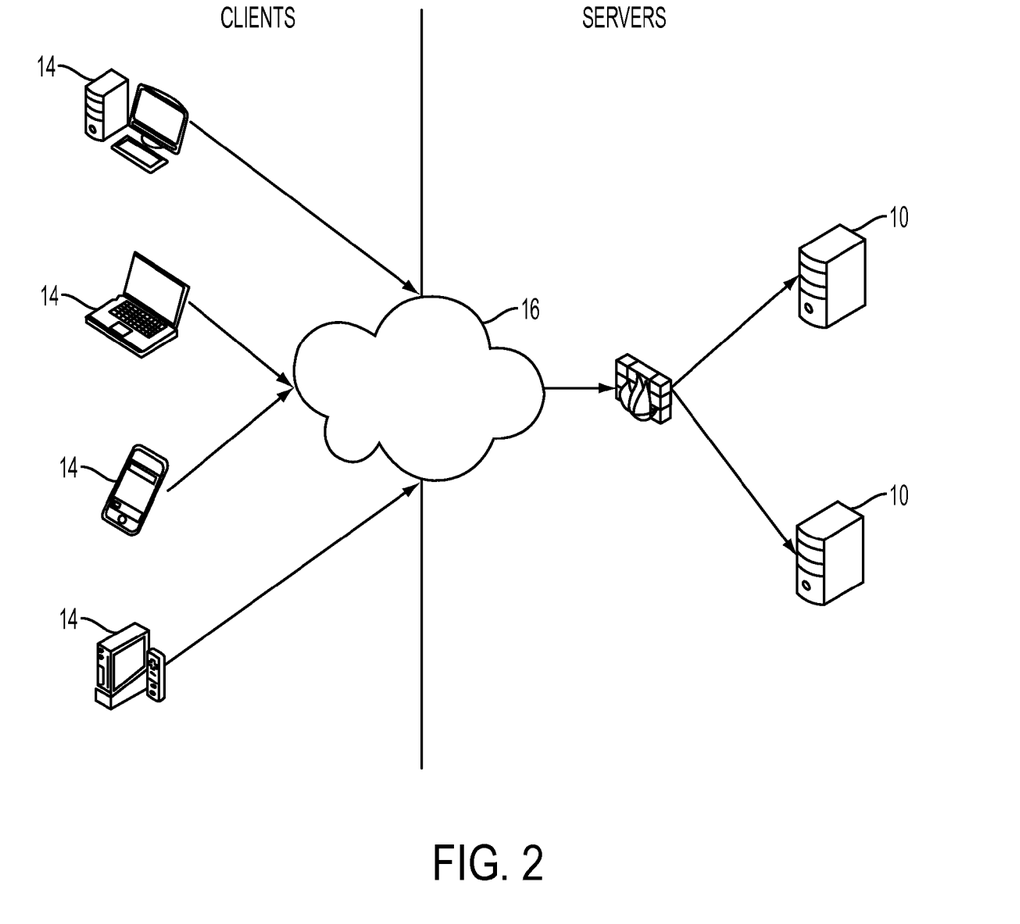
FIG. 2 illustrates another embodiment of a system for client-server 3D rendering of CAD data.

FIG. 2 shows another example system for rendering of CAD data. Multiple servers 10 are provided. The servers 10 connect to the network 16 through a firewall.

The servers 10 include one or more processors and are workstations, part of a server bank, or other server. The servers 10 include ports for communicating through the network 16 with the client computers 14. The servers 10 host full-fidelity CAD data, including exact geometry and appearance, created by an engineer or other designer. The servers 10 interact with a set of clients to render and stream the data to those clients for visualization. CAD data is processed and rendered to provide an acceptable visual representation for different types of client devices. Using remote interfaces, the client operates on the images or CAD data. The servers 10 may have the ability to scale the rendering depending on the type of connected client and the available bandwidth. The servers 10 may continuously stream rendered data depending on the type of connected client while multiplexing requests from multiple clients to provide renderings of the same or different sets of CAD data.

Different types of client computers 14 are shown, such as a personal computer or desktop, a laptop, a smart phone, and a game console. Other types, fewer types, and/or more of any type may be used. The client computers 14 are heterogeneous in terms of client capabilities. For example, different amounts of memory are available. Some may have embedded processors and others may instead or additionally have a graphic processing unit. The display capability may be different, such as the resolution and/or screen size. The client computers 14 allow visualization of the CAD data by the client. Rendered images are requested from the server 10, received as a stream from the server 10, and presented to the user locally on the client computers 14. Using services provided by the server 10, the client computers 14 interact with the CAD data by changing the viewpoint or requesting services that modify the current visualization of the data and displays these results to the user locally.

The network 16 is a single network, such as a local or wide area network. Alternatively, the network 16 is the Internet or a collection of networks. The communications links of the servers 10 and/or client computers 14 may have the same or different capabilities. For example, some client computers 14 may connect through cellular communications (e.g., 3G), others through DSL or cable modem, others with LTE, others on a corporate LAN, and others through T1 lines. The network 16 may have different capabilities for different connections.

In the systems of FIGS. 1 and 2, multiple clients may visualize 3D data at the same time. The number of clients may be greater than the number of entities (e.g., servers) within the cloud (e.g., network 16) that provide the desired rendering capabilities while maintaining interactivity between the client and the served content. There are two constraints that may potentially limit interactivity from the perspective of a client—1) the latency in a server rendering the requested image and 2) the latency in the transmission of that rendered image to the client. To provide the 3D rendering as near an experience to "local" as possible, techniques to adapt and/or reduce the use of channel bandwidth may be provided. Similarly, the rendering or associated computations may be shared between the servers 10 and the client computers 14. A fine-grained tuning of the system architecture to target a wide range of end device capabilities and channel capacities is provided.

The rendering is provided with interactivity. The client is agnostic to whether the data or hardware capabilities exist locally and may access high-end visualizations from lower power devices.

The rendering may be different for different situations. The server 10 may control the way the CAD data is rendered and streamed so that the available aggregate hardware and bandwidth are used to scale appropriately depending on the type of client computer 14 connected. Server-side 3D rendering includes quality of service constraints (e.g. amount of data rendered, quality of resulting image, size of resulting image, availability and usage of network bandwidth, etc.). Combined server 10 and client computer 14 rendering (e.g. client caching, client prediction, scalable coding, etc.) is provided where appropriate.

Figure 3:
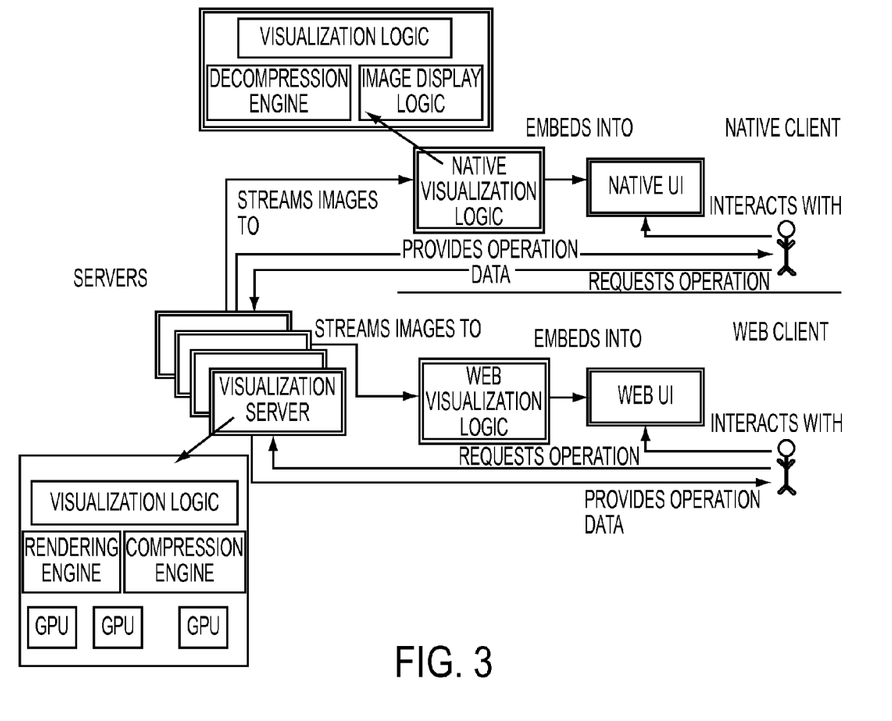
FIG. 3 illustrates example interaction among components of an example system for client-server 3D rendering of CAD data.

FIG. 3 shows one embodiment of interaction in a system context. The visualization and interaction system includes a visualization server that hosts the CAD data, appearance parameters, and rendering capabilities as well as a set of services that allow interaction with the CAD model and a client that hosts a streaming image system. Interaction is propagated to the server, resulting in a new image streamed to the client in response. A native client and a web client are shown. Both clients have access to a user interface (UI) and corresponding visualization logic. The visualization logic includes a decompression engine and display logic. Additional, different, or fewer components may be provided.

The clients communicate with the servers. The servers include visualization logic. The server visualization logic includes a rendering engine, corresponding graphics processing units, and a compression engine. Additional, different, or fewer components may be provided.

In the setup of FIG. 3, the clients interact with the user interfaces to request operation. The client machines request rendered content from "the cloud" or from the servers. The servers stream images or other data to the client machine in response to the request. The servicing of the content is transparent to the client, so the servers might exist in a "private cloud" (e.g., within an organization) or in the "public cloud" (e.g., in a data center or server on the Internet).

The server is responsible for hosting CAD data created by an engineer in an engineering tool (e.g. NX, Catia, Inventor, other commercial CAD system, or a proprietary CAD system). The server contains facilities for rendering the CAD data, compressing the resulting image, streaming the resulting image to a client in real-time, and processing incoming requests from the client that may change the resulting image (i.e. change of viewpoint) or that request additional data from the model. The server acts as a repository and intelligent processor for CAD data, provides that CAD data to a client for visualization in the form of a set of images that change depending on client actions, makes decisions about the data based on the type of client connected (e.g., in the case of smaller form factor devices, a smaller image may be rendered, saving on server time required to rasterize, compress, and transmit the resulting data), presents a service-oriented architecture that allows the client to request information about the CAD data (e.g. measurement, PMI, etc.), and protects the CAD data by not exposing geometry to the client. Additional, different, or fewer actions may be provided. For example, some or all of the geometry information is provided to the client.

These functions of the server transform visualization and interaction into a service provided by the cloud, moving the majority of the logic into the cloud and using the client as a presentation mechanism for data that is rendered and processed remotely. The server manages and controls: each client connection, model request, and current state (e.g. viewpoint, etc.). The server may share resources between clients requesting the same data. Based on the type of client computer and the bandwidth available to the server and client computer, decisions about data quality are made by the server to scale requests appropriately.

The client computer is responsible for receiving streaming image data from the server and presenting that image on screen using local API facilities (e.g. BitBlt). Additionally, the client computer is responsible for translating user actions into interaction messages that are transmitted to the server for processing. This allows the client to present high-quality content, regardless of the local capabilities of the client computer, to provide real-time interaction with the model based on streaming messages from client to server and streaming images from server to client, and to request information from the server in a service-oriented fashion. The same operation may be used whether the client is native or embedded in a web browser.

The server visualization logic is responsible for accepting incoming connections from clients and retrieving the right data for a client. The type of client computer connected is determined as part of a feedback used to communicate with the rendering and compression engines. The server load and available bandwidth are monitored as part of the feedback mechanism used to communicate with the rendering and compression engines. The server visualization logic determines whether or not to distribute work between the client and server, depending on client capabilities. Requests from clients that either result in a re-render or in a business logic action that requires a response are processed.

The rendering engine is responsible for generating a rendered image based on the current data and viewpoint for each client. The rendering engine may generate an incomplete image, such as associated with prediction based on model motion or sparse rendering for compressive sensing. Graphical resources are managed by the rendering engine appropriately across multiple client connections. The rendering engine may dispatch work over multiple GPUs. The image size and/or quality are scaled based on feedback from the visualization logic. The rendering engine applies coherence and acceleration algorithms (e.g. frame differencing, down sampling, tiling, etc.) to generate images, when appropriate.

The compression engine is responsible for generating a compressed representation of the rendered data for each client. The size and quality of resulting compressed image is scaled based on feedback from the visualization logic, such as the processing capabilities of the client computer. The compression engine schedules compression using CPU and/or GPU resources, as available.

To scale, adapt, and/or reduce server load, various techniques may be used. The server rendering and components may use frame-by-frame compression and frame differencing. Each frame or consecutive pair of frames is treated individually and compressed with an appropriate codec, such as DXT5 given latency and bandwidth constraints in a black-box fashion. The appropriate codec is determined by the server based on its suitability with respect to the particular rendered model (e.g., depending on texture, number of polygons, etc). The model is known to the server a priori and thus the suitability of a codec may be pre-computed offline for each model.

Another technique is rendering of the image data at a lower resolution that the physical resolution of the client's display in conjunction with temporal frame interlacing to improve the quality of the client side visualization. Frame interlacing renders and transmits only every n-th line of the image at each instant with a cyclic offset of 1 . . . n between sent frames. An example value for n is 2.

In another technique, the fidelity of the transmitted data (e.g. resolution and frame rate) is adapted to the context of the user interaction. Certain instances of the user interaction may accommodate reduced fidelity of the signal, such as when a model is in rotation per the user's request. The resolution may be decreased without significantly impacting the user experience while reducing the processing burden on the server.

The client computer may use one or more techniques in a cooperative fashion with the server. For example, in case the server chooses sub-sampled and/or temporal interlacing, the client filters the incoming data in order to reconstruct the original signal as good as possible. Spatially sub-sampled data is interpolated (e.g. bi-cubic) to increase the image resolution to the native resolution of the client. Temporally interlaced data is de-interlaced to reconstruct the image at each instant in time (e.g., de-interlacing by blending or motion detection).

The client computer allows requests for re-rendering based on client actions. Clients may visualize and interact with CAD data without complex local installations using pure web technologies. Real-time interactivity may be provided between the client computer and server in the context of server-side rendering. Clients may interact with CAD models without having any of the data available locally. The rendering and compressing may be scaled based on the type of data (e.g. whether the CAD model contains textures, etc.) and the client computer and/or connection (e.g. small form factor vs. large HD screen, gigabit LAN vs. 3G, etc.). The client computer may be used to offload some of the server processing depending on available load and bandwidth.

FIGS. 4-13 show different methods for rendering of CAD data. The methods use one of the systems of FIGS. 1-3 or another client-server arrangement. The acts are performed in the order shown, but other orders may be used. The acts are for one three-dimensional rendering or the creation of one image from data representing a volume. The acts are repeated for creating other images. Additional, different, or fewer acts may be provided.

Figure 4:
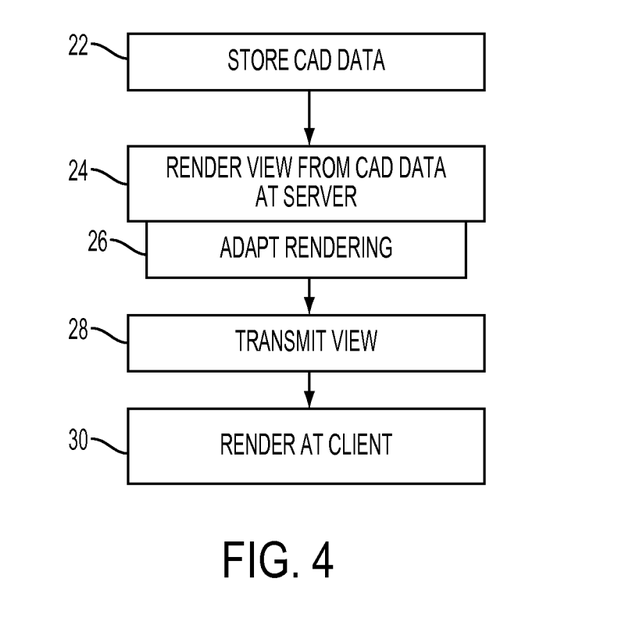
FIG. 4 is a flow chart diagram of one embodiment of a method for 3D adaptive rendering of CAD data.

FIG. 4 shows one embodiment of a method for adaptive rendering of computer assisted design data. Additional, different, or fewer acts may be provided. For example, the adaptation of act 26 of the rendering by a server in act 24 may result in the client not performing any rendering in act 30. As another example, acts for client communications, such as communicating client capabilities and/or user control or navigation to interact with the rendered model, are performed.

In act 22, computer assisted design (CAD) data is stored. CAD data represents a model created by a designer or engineer using a commercial, custom or other program, such as NX, Catia, or Inventor. The model and corresponding CAD data includes geometric information. Geometric information includes shapes, sizes, and relative relationships, such as the relationship and connections of different components of the model with each other. Fixed, flexible, rotatable, slideable, or other relationships may be provided. The CAD data may include other information, such as textures. The CAD data is in any format, such as being represented by polygons, surfaces, or voxels. The CAD data is noiseless data since the model is designed or created. In other embodiments, the CAD data includes noise, such as by incorporating measured or sensed characteristics.

The CAD data represents the model of three-dimensional structure. The 3D structure is of a part, building, machine, system, arrangement, collection, process, or device. For example, a factory, assembly line, finished product (e.g., car), or piece (e.g., a screw) is represented in 3D. The characteristics of the model have three spatial dimensions, such as extending along three orthogonal axes rather than being a two-dimensional cross-section.

The CAD data is stored remotely from a client computer. The client computer may be used by the engineer or designer at a different location (e.g., home or when traveling) than where the design is created. The client computer may be used for creating the design (e.g., work computer or workstation). The client computer may alternatively or additionally be a computer used by a manager, colleague, customer, or other for reviewing the model.

The CAD data is stored at the server or other location remote from the client computer. Remote includes in a different room, different building, different county, different state, or different country. The storage may be remote in some cases and not remote in other cases, such as where the CAD data is stored in a memory associated with a workstation for design and remote from a computer used when traveling. By having the CAD data "in the cloud," the CAD data is accessible remotely from different client computers.

A database, memory, cache, RAM, or other memory stores the CAD data. After or during creation, the CAD data is uploaded to or stored for later access by the same or different computer.

In act 24, a view of the 3D structure is rendered from the CAD data. Any type of rendering may be used. Surface rendering, projection rendering, or other rendering technique is used. In one embodiment, a graphics processing unit renders using textures, fragments, and vertexes with alpha blending. Visual effects, such as lighting and/or fog effects, may be included in the rendering. Any transform function may be used.

The CAD data is used to render a view of the model. The geometry represented by the model is rendered from a 3D structure to a viewing plane. The spatial relationship of components of the model and of the components themselves is used to render the 3D structure as if being viewed by the user. The viewing plane is behind the 3D structure relative to a viewer, but may be a cross-section of the model to render a portion of the 3D structure.

The rendering is in response to a request from a client computer. The remote, client computer requests the view of the model. The viewing direction and any other rendering parameters (e.g., shader settings) may be communicated from the client computer to the server. In response to the request from the client computer, the server generates the view. The server may receive requests for views of the same or different model and corresponding CAD data from other client computers at the same, similar, or other times.

The server is remote from the client computer. The server receives the request over a network, and responds to the request. The response may be a request for more information, a confirmation, and/or the transmission of the view in act 28. By rendering with the server, rendering quality not available at the client computer may be provided. For example, the client computer may not have the memory, graphics processing, or other capability to perform any or some rendering. The client computer may be unable to perform some techniques, such as shading, at interactive speeds (e.g., speeds associated with rendering ten or more frames per second while a user rotates, translates, or scales the view). The server may be able to render where the client computer cannot.

To render multiple views of the same CAD data for different client computers, the server may multiplex the rendering between views. Rendering multiple views even of the same CAD data may tax the processing of the server. For rendering multiple views from different CAD data, the server may have to cycle different sets of CAD data into and out of the memory used for rendering. This thrashing increases the burden on the server.

Given the burden on the server to render multiple views of the same or different CAD data, various techniques may be used to reduce the processing by the server. One or more techniques may be used. Multiple techniques may be used together. The techniques used may adapt to the situation, such as the burden on the server and/or the capabilities of the client computer. For example, different combinations of techniques are used for client computers with little or no native rendering capability than for client computers with graphics processing units. As another example, the number of clients, any overlapping in data or view point from different clients, and/or the content of the requests is considered for adapting the techniques used.

Figure 5:
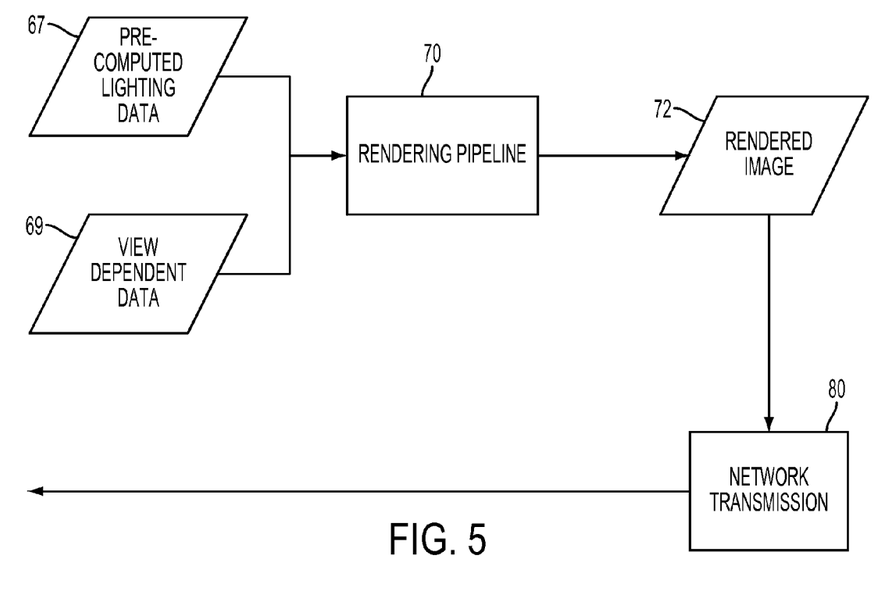
FIG. 5 is a flow chart diagram of one embodiment of a method for 3D rendering of CAD data with pre-computed lighting data.

FIG. 5 represents one approach to reduce the burden on the server for rendering. The rendering of the model may be of a static scene. A static scene does not include objects moving relative to each other. The lighting changes only in response to the client's point of view, leaving the relationship between the light(s) and object(s) in the scene unchanged. For a static scene in visualization of a CAD model, a portion of the lighting model may be pre-computed on a server. Any lighting that does not depend on the specific viewpoint (e.g., diffuse lighting) is pre-computed. For example, a modified G-Buffer method, where several textures are created by the server containing the information needed to perform the lighting computations are pre-computed, is used. The server transmits the textures to the client for the client to compute the final lit scene. The portion of the lighting model is computed when the CAD data for the view is loaded into the rendering memory (i.e., at load time) in act 67. The pre-computed portion of the lighting model is stored, such as storing the pre-computed portion of the lighting model in a texture. As the client's viewpoint changes, the view-dependent lighting contributions are calculated in act 69. As the view is rendered, the pre-computed and view-dependent portions are modulated in act 70. Any modulation may be used, such as multiplying the light that is not view direction dependent with the light that is. The modulated lighting is used for shading in the rendering. The resulting rendered image 72 is transmitted to the client in act 80. Pre-computing some of the lighting may save computation in the most expensive part of the pipeline (i.e. the pixel shader). Additionally, since the pre-computed portion applies to the scene and not the viewer, the pre-computed portion may be shared across multiple clients that might be viewing that same scene and applied by the client computers.

Figure 6:
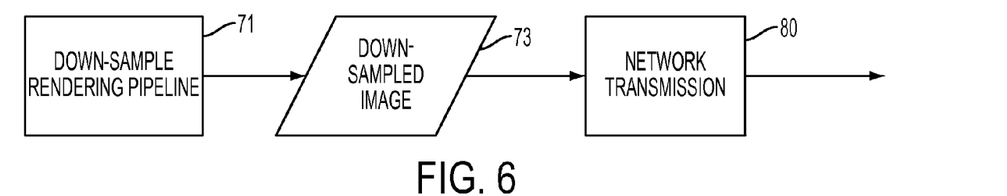
FIG. 6 is a flow chart diagram of one embodiment of a method for 3D rendering of CAD data with down sampling.

In another approach to reduce server burden, sub-sampled images are rendered. FIG. 6 represents this approach. In act 71, down sampled rendering is performed. Rather than use all of the CAD data, only a sub-set or sparse sampling of the CAD data for rendering is performed. For example, every other sample or location is used. The down-sampling may be along a depth direction and/or in the viewing plane (e.g., render to a fewer number of pixels). The resulting down sampled image 73 is transmitted to the client in act 80.

Sub-sampling decreases bandwidth linearly. Frame interlacing may alleviate loss of fidelity. Compression reduces the amount of data transferred to the client. Compression decreases network latency, but does have the disadvantage of slightly increasing the rendering latency. By rendering the image at a down sampled resolution as opposed to the original resolution, rendering latency may be reduced. Sub-sampling may have the effect of reducing the pixel shader computations required to perform the subsequent compression algorithm, thus reducing the overall rendering latency. Sub-sampling may decrease the network latency, as the size of the resulting compressed image should be much smaller due to the smaller size of the original rendered image. The disadvantage of sub-sampled rendering is that the client may experience banding or posterization after up-sampling. In certain situations, this may be acceptable (e.g. shape review), but in others the quality of the up-sampled image may be prohibitive.

In another approach, interlaced images are rendered. This technique is similar to rendering down sampled images, except the image is not down sampled. Instead, only half or other fraction of the image is transmitted for each frame or view. The other half or fractions of the image are rendered and transmitted in other frames or views. The client computer combines the interlaced images (e.g., compose a view with the other half of the view of the previous frame on the client side). Any interlacing pattern may be used, such as rendering every other line or rendering by multiple regions. Interlacing may result in more visually appealing final image, but may reduce the frame rate of the displayed images by half or other fraction. To avoid frame rate reduction, the fractional or partial views may be presented in sequence. Interlacing may give the impression that the image is in motion with respect to the client's operation. If the affine transformation step associated with rotation of the view is small enough between consecutive frames, there will be little perceivable difference for the client between the interlaced image and the actual full image that would have been transmitted in the normal case. For greater motion, the interlacing may result in an undesired artifact.

Referring to FIG. 4, the rendered view is transmitted to the client computer in act 28. FIGS. 6-9 and 13 transmit the rendered view in act 80. The transmission is over a network. In alternative embodiments, the transmission is wireless. Any format may be used, such as each view in a series of views being a frame of data representing the rendered view.

Various techniques may be used to reduce the bandwidth required for the network. For example, frame-by-frame image compression is performed. The rendered images may be at any resolution, such as a high definition (HD) resolution (i.e. 1920×1080). The image size in amount of data may be 8 MB or more. To transmit such images, a 100 Mbit/s network speed may be needed for transfer to a single client. The sheer size of a single rendered frame may limit interactivity due to network latency. Image compression may decrease the amount of data transmitted over the network at any given point in time.

Any codec or compression may be used. Lossless compression may be used, but may not afford the compression ratios sufficient to speed up significantly the frame rate on the network bandwidth. Lossless compression may be appropriate for low-contrast images that have large regions of the same color. Lossy compression may be used to provide a greater compression ratio.

The compression used may be selected. The view may be dynamically analyzed as created or at interactive speeds during rendering. The server chooses the appropriate compression algorithm to use based on a set of characteristics of the scene (e.g., texture and geometric complexity characteristics) and indicates the compression to the client computer. Alternatively, the compression is fixed such that one type of compression is always used.

Typical HD video streams are compressed using the H.264/MPEG-4 standard. This compression relies on a series of known images. For server rendering with interaction with the user, the frames exist as separately rendered entities independent of each other. Each frame or consecutive pair of frames is treated individually since the next frame may not be known due to user interaction and/or operation of the model. H.264 may not be used directly.

Any single frame or image compression may be used. DXT5 may be provided in a black-box fashion given latency and bandwidth constraints. It is possible, however, to use ideas from the H.264 scheme to transform single images and rely on a separate compression scheme to compress the transformed frame. H.264 uses the $YC_oC_g$ color space. Since the stream of compressed frames will be decoded back to the RGB color space for display on the client machine, the $YC_oC_g$ color space may be used. The transformation from RGB to $YC_oC_g$ (RGB→$YC_oC_g$) is a simple conversion using only integer additions and shifts. Transformation is used because the RGB color space produces widespread artifacts during compression. A color space, like $YC_oC_g$, may leverage characteristics of the human eye by encoding luminance at a higher bit value than the chrominance. Using DXT5 compression, the $YC_oC_g$ frame may be encoded and compressed at a 4:1 ratio. Other transforms and/or compression may be used.

Figure 7:
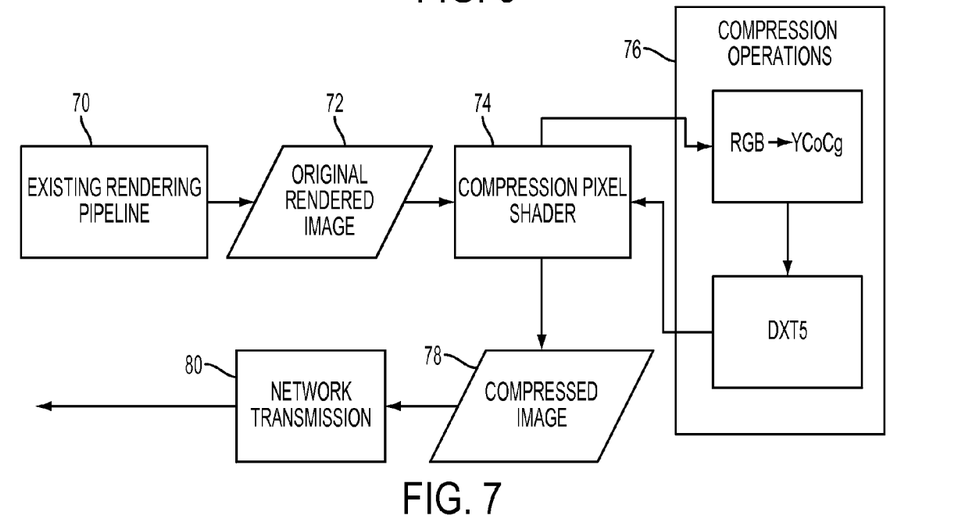
FIG. 7 is a flow chart diagram of one embodiment of a method for 3D rendering of CAD data with compression.

FIG. 7 represents one embodiment of compression. In order to increase performance, the transformation and compression are performed by the graphics processing unit (GPU) of the server as part of the rendering pipeline. The image 72 is rendered in act 70. The rendering pipeline is also used to transform and compress in act 74. For example, servers in the cloud rendering the visual content modify the rendering pipeline to render the compressed texture to an off-screen buffer. The data from the off-screen buffer may be read back from video memory. The transformation and compression are performed as a shader routine in the GPU. The GPU performs the transformation and compression represented in act 76, but other transformations or compressions may be used. The compressed image 78 is transmitted over the network to the client computer in act 80. On the client computer, the image is decompressed.

Figure 8:
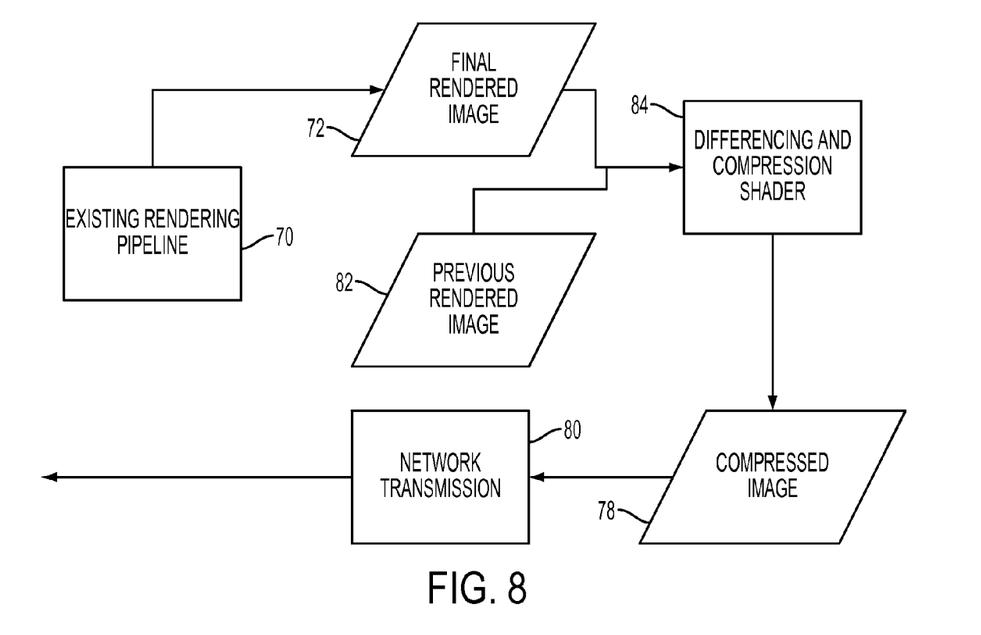
FIG. 8 is a flow chart diagram of one embodiment of a method for 3D rendering of CAD data with differencing for compression.

FIG. 8 represents another type of compression that may additionally or alternatively be used. Frame differencing is used, so more than one image is relied on for the compression. The server renders the image 72 with a rendering pipeline in act 70. A previous image 82 is obtained from storage, such as where the previous image 82 is a reference image of a moving window. The previous image 82 is a most recently rendered image, such as be the image rendered just before the image 72 with no intervening images having been rendered. The server stores the last rendered frame for each client (e.g. as a texture) and uses this frame as the subtrahend in a frame differencing operation with the current rendered frame. One or more intermediate renderings may be performed, such as where the previous image 82 is a reference image used for differencing from a set of subsequent images.

In act 84, differencing and compression are performed. The GPU of the server is used, such as creating a shader routine for differencing. Additional compression gains are provided by differencing. If the client performs an operation or the model includes motion that is fairly incremental (i.e. small affine transformations), there should be minimal differences between subsequent images 72, 82. The images are subtracted, resulting in a difference image. The frame difference for small affine transformations is primarily uniform, which lends well to compression. The difference is compressed. For example, the difference is transformed and compressed. The compressed difference image 78 is transmitted in act 80. The client computer extracts the difference by decompression and then adds the difference to the previous image to present the current image.

In another approach for reducing network latency, the server uses scalable coding. The same view may be transmitted to different client computers in a collaborative application. For example, one user controls the view during a design review. The same view is transmitted to different viewers or client computers. Since the different client computers and/or network connection may have different capabilities, the compression may be scaled differently for the different client computers receiving the same view. Data may be generated and transmitted efficiently across several image scales. The compression is scaled to various levels to deliver quality of service to clients in cloud-based rendering.

By introducing scalability techniques into the pipeline, the GPU of the server may create scalable codings of a view sent to multiple clients over different bandwidth links and for display at different resolutions. Using knowledge or measurements of bandwidth or speed of the network in a connection between the server and client computer, the type of compression used may be selected. Using communications with the client computer, the server may determine the resolution capabilities of the client computer. For example, the client computer as a desktop may have greater resolution than the client computer as a smart phone or tablet. The type of compression is selected based on the compression ratio relative to network bandwidth and the resolution relative to the client computer capability. The server side encoding and the client side decoding are set to the compression most appropriate for a given situation. The compression used may be different for different computers, allowing optimization of size of transmissions in aggregate over the network. The same view may be compressed differently for transmission to different client computers.

Referring to FIG. 4, the rendering and/or transmission of acts 24 and/or 28 may adapt in act 26. The rendering performed by the server adapts as a function of the bandwidth, capability of the client computer, or both. The bandwidth may be of the server processing or of the network for transmission. For example, the server may render multiple views for a corresponding multiple client computers, so has less bandwidth for rendering than if a fewer number of views were being rendered. The capability of the client computer may be for rendering, decoding, screen resolution, or other factor associated with the size of images displayed, the rate of images, and/or the ability to perform rendering. The rendering pipeline is split between the client and server such that capability and bandwidth constraints are met.

The bandwidth may be known. For example, data representing the bandwidth is stored, such as storing a process burden for rendering an image and a processing capability of the processor. Alternatively, the bandwidth is measured. For example, the network or client computer may be pinged.

The capability of the client computer is known or obtained. The server may use the identity of the client computer to access a database indicating capability. Alternatively, the client computer communicates the capability to the server.

The rendering or transmission adapts the approach, settings for an approach, and/or type of approach. For example, the compression is scaled as discussed above. The adaptation is of the algorithm used by the server.

The adaptation is for a given situation or client computer and corresponding connection. The adaptation is performed to configure the server and client computer for interaction during a given imaging session. As bandwidth and/or capability change, the adaptation is not repeated. Alternatively or additionally, the adaptation is ongoing, such as adapting periodically, in response to triggers, or in an on-going manner through an imaging session. As the bandwidth and/or capability changes during the imaging session, the rendering and/or transmission adapt.

In one embodiment, the rendering performed by the server adapts with the client computer. The distribution of processing between the server and the client computer adapts. The adaptation shifts the burden from or to the server to or from the client computer to any amount. For example, the adaptation is a selection between rendering the view as an image solely by the server and rendering the image in combination by the server and the client computer. The client computer, such as a tablet, smart phone, or laptop computer, may be incapable or inefficient at rendering to a desired level, so the server solely renders the view. The client computer may be capable of assisting in rendering, so may share some rendering burden. Adaptation shifting the relative burden while still performing rendering by the server and client may be provided.

Figure 9:
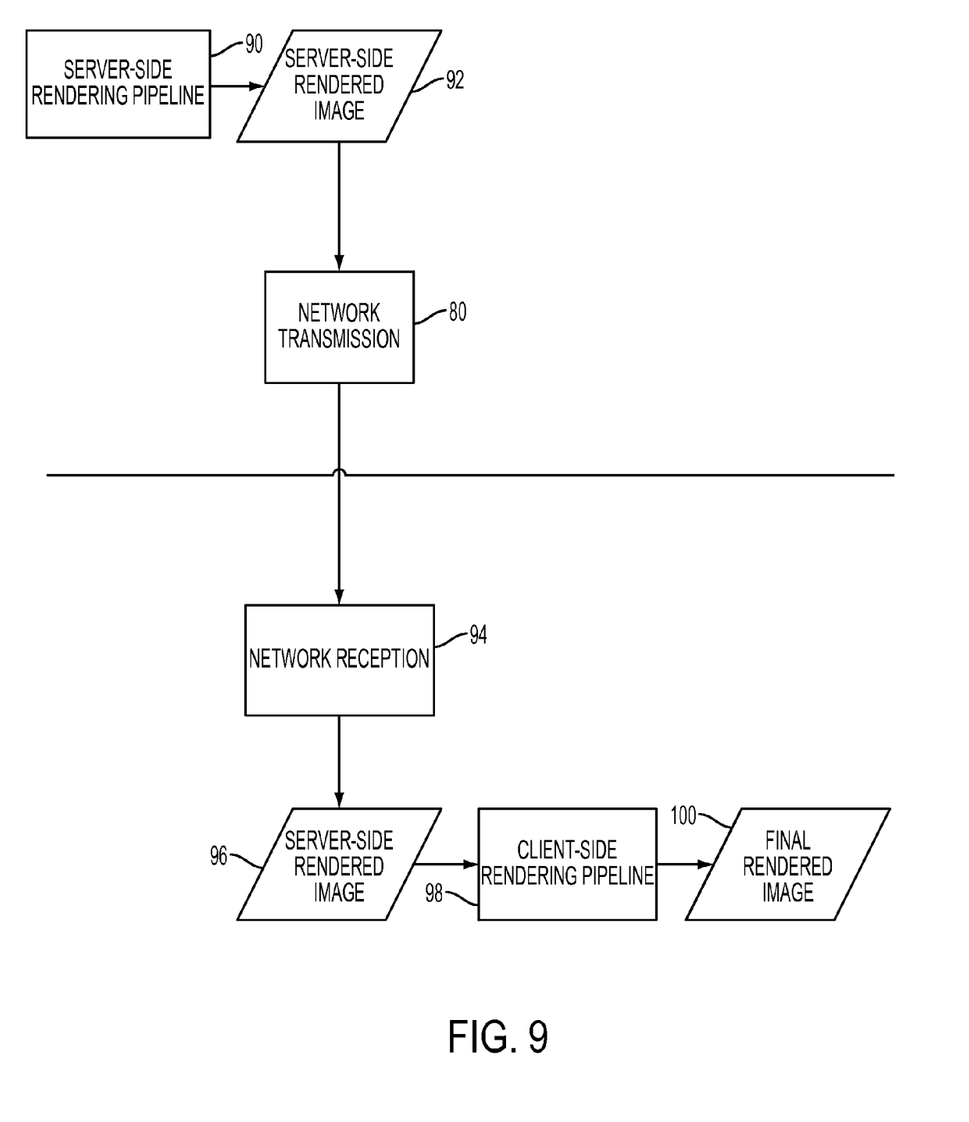
FIG. 9 is a flow chart diagram of one embodiment of a method for joint server and client 3D rendering of CAD data.

FIG. 9 represents combined rendering by the server and the client computer. In act 90, the server-side rendering of the view 92 is performed. The view is transmitted to the client computer in act 80. In act 94, the client computer receives the transmitted view 96. In act 98, the client computer performs client-side rendering, resulting in the final image 100.

The combination of server and client computer rendering may use one or more different techniques. In one technique, the server pre-computes information to be used by the client computer for rendering. For example, static lighting scenes are pre-computed and distributed to any client computers for a set of CAD data. The lighting coefficients of a global lighting solution are shared by the server with the client computers. The client computer may handle residual viewpoint-dependent terms for lighting the view.

In one technique, the server renders the view from geometry of the CAD model. One of the advantages of rendering in the cloud is that the server does not have to expose the geometry of the model and corresponding CAD data to the client. By performing rendering of the geometry from the model at the server side, the CAD data may not be transmitted to the client computer.

The client computer performs one or more rendering operations associated with an output of the geometry rendering. The client-side rendering may not rely on explicit position information (i.e. the interpolated transformed geometric data that is typically an input to the pixel shader). For example, a non-photorealistic rendering application is performed by the client computer. Non-photorealistic rendering application may include silhouette lines in an assembly. The lines are highlighted, thickened, or brightened. Other image space operations may be performed by the client for client-side rendering, such as a lighting operation, masking, segmentation, or filtering.

In other embodiments, some geometry is rendered by the server and some geometry is rendered by the client computer. For example, sparse rendering is performed by the server, and the client performs the remaining rendering from geometry. As another example, the server performs alpha blending and the client adds lighting information. Any division of labor may be used.

In another technique for shared rendering, sparse dictionary coding is used. The dictionary is a collection of data. In one embodiment, the dictionary defines different patches, textures, patterns, or other components that make up part of an image. Orthogonal or over-complete dictionary elements and coding coefficients are provided as the dictionary.

The dictionary is chosen such that the resulting coefficients are sparse. For example, L1 minimization is used for reconstruction based on the dictionary. The coefficients may not define all possible parts of the image. Where a dictionary entry and corresponding coefficient are not available, that portion of the rendered view may be transmitted as image data rather than coefficients.

The image is represented as a combination (e.g., linear) of an over-complete dictionary. Coefficients are used to reference the dictionary, defining the data to be used for one or more locations. An image may be generated by the client computer from the data of the dictionary. The coefficients reference the dictionary for different image locations. The client computer assembles the image from the dictionary data based on the coefficients. Fewer coefficients are used than data to assemble the image. The server communicates the coefficients of a rendered image to the client computer for assembly of the view.

The dictionary may be pre-computed and provided to both the server and the client computer, such as from a database. The pre-computed dictionary is stored remotely or at the client computer and/or server for assembling an image from the patches or other dictionary components.

In another embodiment, the dictionary is created over time by the server for use by a given client computer. The dictionary is defined by the server. As one or more views are communicated to the client computer, coefficients and the dictionary are defined. The client computer accumulates the dictionary entries and corresponding coefficient references. As any later views with parts of the image that are the same as already accumulated dictionary data occur, these parts may be communicated by coefficients rather than the rendered data. The client computer uses the accumulated dictionary to fill in the appropriate portions of the view.

Fewer coefficients may have to be transmitted for larger dictionaries. The dictionary size and number of coefficients may be traded against each other. As more images are transmitted, fewer and fewer coefficients may be transmitted to define a whole image due to the accumulation of dictionary entries. A dictionary entry may be of a whole or complete image such that a single coefficient indicates the image from the dictionary. The transmission of orthogonal, over-complete, or other dictionary elements and coding coefficients are spread temporally to increase fidelity over time while sufficing channel constraints. Viewing may begin by transmitting a lot of coefficients and some dictionary entries and aggregating the dictionary on the client. The more frames that are transmitted to the client, the bigger the local dictionary on the client becomes. As a result, fewer and fewer coefficients need to be transmitted, reducing bandwidth usage over time. Alternatively or additionally, the fidelity is increased over time instead of or with reduction of the bandwidth.

The trade off between bandwidth and fidelity may adapt, depending on requirements. Whether to use sparse dictionary coding or not may adapt based on the capabilities of the client computer and/or the bandwidth.

Figure 10:
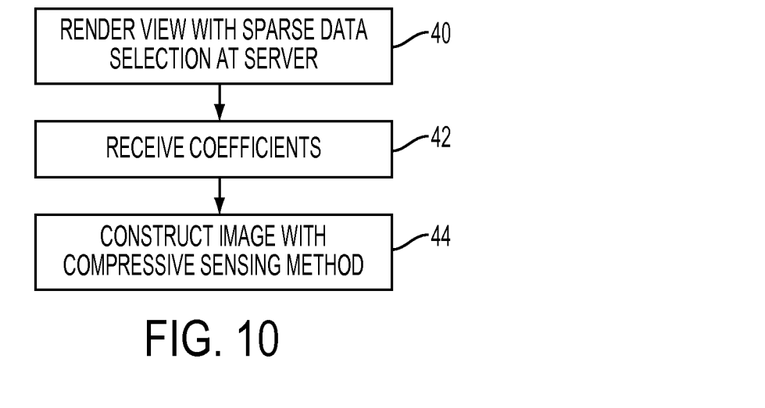
FIG. 10 is a flow chart diagram of one embodiment of a method for 3D rendering of CAD data with compressive sensing.

FIG. 10 represents an alternative embodiment of sparse dictionary coding. FIG. 10 is a method for rendering CAD data. Compressive sensing is used for cloud visualization. The known scene geometry is used to enable L−1 minimization as the decoding scheme. The compressive sensing or other dictionary encoding may shift processing burden between the server and the client computer. In this embodiment, the server may sparsely render, reducing processing bandwidth. The processing by the client computer to decode or up sample from the coding for creating the image may be increased.

In act 40, the view is rendered with sparse data selection at the server. The server applies a filter mask that is maximally incoherent. Only some pixels are rendered. The pixels to be rendered in the view are selected based on maximally incoherent sampling of the CAD data. Since the CAD data may be noiseless data, the sampling may be provided with little or no loss of information in the final image. The overall process is superficially similar to orthogonal encodings. The main difference is that the specific measurements made are maximally incoherent with the encoding dictionary. It is known how the signal is generated, so the incoherent measurements may be selected much more intelligently. Locations for sparse signals, such as zero value or close to zero value, are identified and not selected. For the noiseless signals, the maximally incoherent selection is performed using any technique.

In act 42, the coefficients of the view are received by the client computer from the server. The coefficients are the rendered pixels from sparse rendering. The coefficients represent pixel values at some, but not all, locations. These sparse coefficients are received from the server via a network transmission or loading of data from memory.

In act 44, the client computer constructs the final image with compressive sensing. The sampling scheme (e.g., maximally incoherent encoding) is known, so a reverse transform is applied. Any compressive sensing may be used. For example, a weighted linear combination of samples is performed. An underdetermined matrix equation is solved since the number of compressive measurements taken is smaller than the number of pixels in the full image. Adding the constraint that the initial signal is sparse enables the solution to this underdetermined system of linear equations. By applying the compressive sensing on the noiseless data of the sparsely rendered view, a full view is generated by the client computer.

Figure 11:
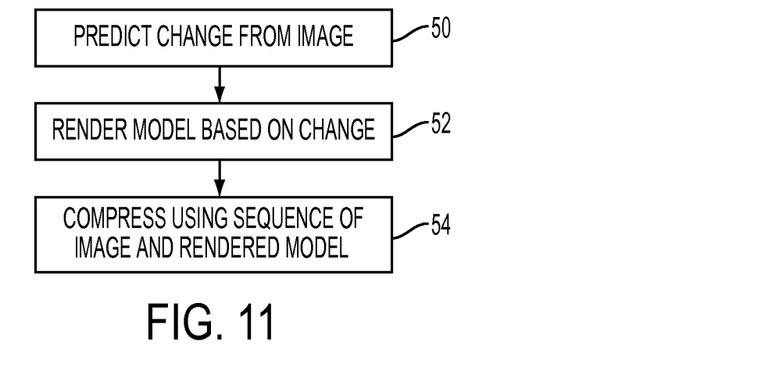
FIG. 11 is a flow chart diagram of one embodiment of a method for 3D rendering of CAD data with model-based prediction for compression.

FIG. 11 represents a method for reducing network bandwidth. To increase compression, predictive coding may be used. The predictive coding is model-based or user-based. Rather than rely on compression specific to a given image, predictive images may be generated to provide a sequence for compression. Compression based on multiple images in a series may be more efficient or have a better compression ratio. As a generalization of the frame differencing for compression, predictive coding is used. The compression relies on a difference between two or more images. A compressed frame is a combination of the previously transmitted data. Video codecs, such as MPEG, rely on a series of images. For client-server rendering, the series is not available immediately as the changes are not known. There may not be enough run-time data to achieve predictive encoding on the server. Since the model may incorporate moving elements and/or the viewer may change one or more settings (e.g., view direction or lighting), prediction is used. The signal is based on a model of geometry and appearance, so the implementation has data about the characteristics of the originating signal.

In act 50, a change is predicted. The change is from a rendered view. The change to an image that is likely to occur is determined. Any prediction technique may be used.

For model-based prediction, the change in the view is based on the model. The known scene geometry, lighting, and appearance information is used to improve the coding performance in a compression scheme as a white-box. The change dictated by the model is determined. For example, a component may move behind another component given a point of view. This change in occlusion is predicable from the model. With reasoning about perspective behavior or occluding contours, the predictive coding is sped up such that video compression is computationally feasible within the client-server interactive rendering of CAD data. In this way, the interframe correlation from the final signal does not have to be detected. Instead, this action is done much earlier in the rendering pipeline in the sense of predicting the change based on the model.

For user-based prediction, the user interaction is predicted. The view point or view angle is predicted. The user may be assumed to be consistent in change. For example, once the user begins to rotate the viewing direction, this change may be at a generally constant velocity. The change is predicted based on the on-going change.

Both user and model-based predictions may be made. The prediction is of change from a previous image.

In act 52, the CAD model is rendered based on the change. The prediction is used to generate an image. An affine transform is applied to emulate the predicted change for rendering.

While the model is in motion due to components of the model and/or user changes, the prediction is used to generate one or more rendered images. The prediction may result in change in the 3D structure that is rendered. Alternatively, the prediction may result in a change in the image space. One or more rendered images are generated based on the prediction. For example, a set of frames is generated to cover the predicted changes at different times. The set of frames may be used for compression during motion.

The predicted change is used for rendering in 3D or image space. For example, model based prediction may be used to change characteristics of previously rendered image in image space or may be used to change the 3D structure for rendering from the 3D space. As another example, the user based prediction may be used to change the location of edges or texture in image space or may be used to change the position of the 3D structure for rendering from the 3D space. Whether changing in 3D or 2D space, the rendered image is altered as a function of the relative motion of objects or relative motion to the viewing location.

In act 54, compression is performed based on the predicted image and an actual image. The rendered image and predicted image are used for compression as a video. Any video compression may be used, such as MPEG or H.264. The actual, rendered image is compressed using the predicted image as part of the sequence of images. The rendering of the model based on predicted change is used to assist in compressing the actual, rendered image. This may continue in an on-going manner, using an actual rendered image or images in combination with one or more predicted images for compression.

The predicted change is associated with movement. Since the prediction may be incorrect, use of the image rendered from the prediction may cause artifacts when the sequence of actual images is provided. One or more images of the actual sequence may be different due to compression relying on the prediction. Since the prediction relies on change, the prediction is appropriate when motion is occurring in the sequence of images. Due to the motion state, the artifact may be more acceptable. Low-quality sub-sampled images may be provided during the movement. The low quality frames may have sufficient detail for intelligible viewing even though being motion blurred.

Figure 12:
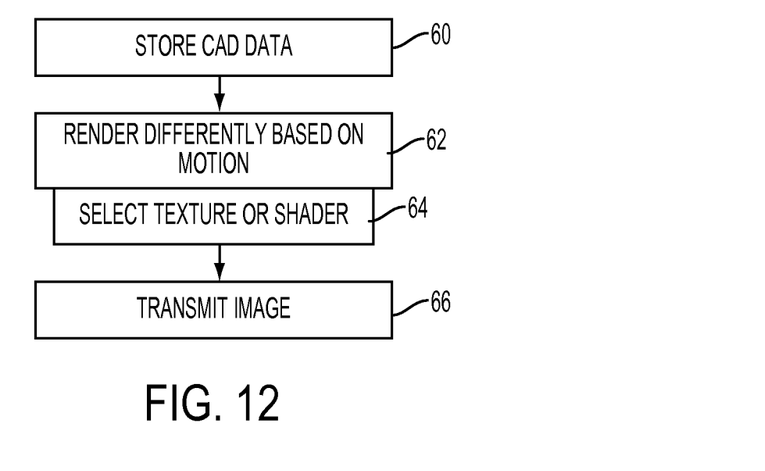
FIG. 12 is a flow chart diagram of one embodiment of a method for motion adaptive 3D rendering of CAD data.

FIG. 12 represents a method for adapting the rendering to provide rendered images of different quality. The CAD data may be used to render images of different quality in different situations. The computations for rendering by the server and corresponding bandwidth are temporally distributed. The distribution provides fidelity when more is desired by the user. For example, greater resolution or quality images are rendered for static or images associated with little or no motion, and lesser resolution or quality images are rendered during object motion when lower fidelity is often acceptable. Full fidelity is recovered when motion has ceased.

In act 60, the CAD data is stored. The storage is local or remote from the server. The CAD data is stored in a database or other memory remote from the client computer.

In act 62, a sequence of images is rendered. The sequence is of views of the model at different times. The CAD data is used to render. The images may be repetitive, such as associated with no motion. The images may include motion due to the model and/or user interaction.

The images of the sequence are rendered, at least in part, by the server. The server may render the final image or may operate in combination with rendering by the client computer to render the final image.

The level of detail of the images within the sequence may vary. Images associated with little or no motion may have more detail than images associated with more or a threshold amount of motion. The amount of motion may be determined from the CAD model and/or user interaction, such as a change in view point or known model motion.

The rendering is different for images associated with different amounts of motion. The difference may be binary, such as one quality level for little or no motion and a different quality level for greater motion. The difference may be scaled over three or more settings.

Any difference may be provided. For example, different down sampling or levels of sparse sampling are used for different amounts of motion. As another example, different shading is used for different amounts of motion. Any difference in rendering resulting is less computation by the server and/or the client may be used. Other differences may alternatively or additionally be provided, such as associated with act 64.

In act 64, the level of detail associated with texture detail, shading, or texture detail and shading is used for rendering based on the amount of motion. Lower quality texture, shading, or texture and shading are provided for more motion than for no or little motion. The texture, shading, or both varies for rendering images based on the context.

Figure 13:
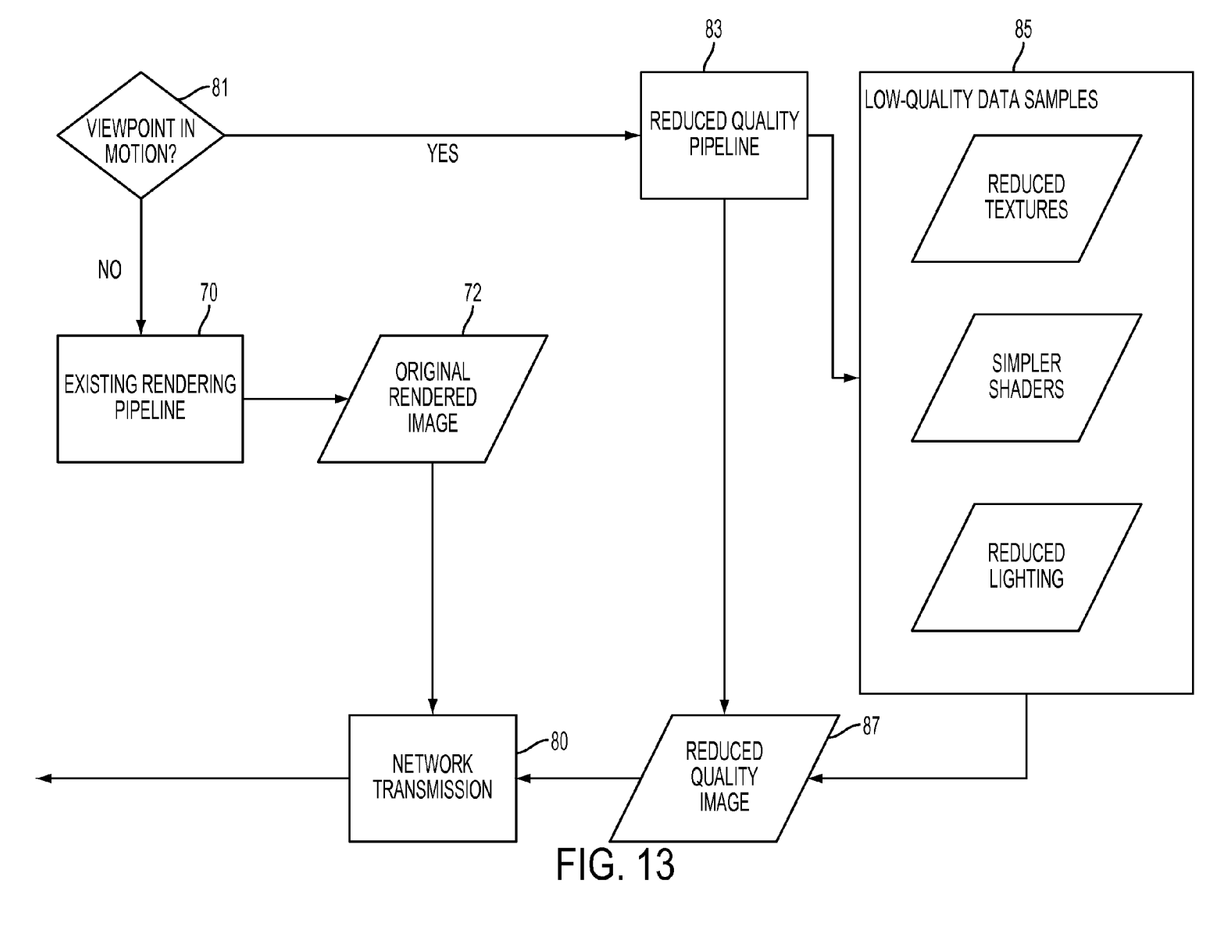
FIG. 13 is a flow chart diagram of one embodiment of a method for 3D rendering of CAD data with quality selection.

FIG. 13 is an example flow for varying the quality using texture and/or shading. The quality of the streaming is based on the motion. In an ideal situation, the client would like to see full HD, ultra-high quality images. The disadvantage of down-sampled image techniques is a loss in quality (e.g., 2× down sampling may result in visible artifacting due to both sampling and compression). By using techniques to render a "lower quality" image for the client while the client is performing a motion-oriented action (such as an affine transformation), the artifacts may be more acceptable.

In act 81, motion is determined, such as whether the viewpoint is changing. If the viewpoint is not in motion, the image 72 is rendered in act 70 with higher quality, such as no or little down sampling. Once any operation to change the view point is stopped, the full quality rendered image is streamed in act 80. For example, a client is performing a design review of a complex assembly and would like to see the opposite side of the assembly. The client performs a rotation that brings their viewpoint to the side of the assembly they are interested in viewing. This motion is detected in act 81. The change may cause many images to be rendered by the server (e.g., one per discretized point of the view direction between the original and final viewpoint). If all of these images were streamed at full quality, there may be a perceivable lag at the client side between the time the client stopped the rotation and the point at which they see the final image appear. Since the client was really interested in the final image and since the client does want to see the assembly change as they rotate their view, a compromise is made by rendering lower quality images at the discretized points and a higher quality image at the time the operation comes to an end.

In act 83, the rendering with lower quality is performed during the motion of the view point. Down-sampling, compression, or other approaches to reduce rendering burden on the server may be used for rendering the lower quality images during motion. The resulting images 87 are transmitted to the client computer.

In act 85, the lower quality is achieved with lower quality textures or different shading. Rather than or in addition to lowering the quality with smaller (e.g., down sampled) or compressed images, different textures may be used. The CAD data includes textures for different quality images. The advantage of using lower quality textures is a decrease in both rendering latency and rendering resources. Lower quality textures require less RAM on the video card, freeing up additional resources that can be used by additional clients connecting to the same server to help avoid texture thrashing. Similarly, simpler techniques in the shader programs may be used to render the images associated with motion. Different shaders may use different amounts of memory and/or processing. The lighting used in the shaders may be reduced or not used to further reduce the rendering burden.

Referring again to FIG. 12, the rendered images of the different quality levels are transmitted to the client computer. The rendered images may be final images or may be transmitted for further rendering by the client computer. The client computer then displays the sequence of images to the user.

Using any one or more of the different techniques may assist in rendering CAD data in the cloud or by a server in a client-server environment. High quality rendered images may be provided to client computers that lack the capability to generate such images. Different clients may receive similar images despite differences in capability. A hierarchy of client devices may be used seamlessly in a common remote rendering and visualization architecture. This is a differentiating factor when common data is shared and visualized by a heterogeneous set of parties as is typically the case for product lifecycle management. The end customer benefits from effortless and user-friendly access to product lifecycle data without significant setup overhead while reducing maintenance and upgrading cost due to centralized server control and strict separation of tasks between client and server.

The server and client computers perform various acts described herein. These processors are configured by instructions for rendering of computer assisted design data. A non-transitory computer readable storage medium stores data representing instructions executable by the programmed processor. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device. The processor is a single device or multiple devices operating in serial, parallel, or separately. The processor may be a main processor of a computer, such as a laptop or desktop computer, or may be a processor for handling some tasks in a larger system, such as a graphics processing unit (GPU). The processor is configured by instructions, design, hardware, and/or software to perform the acts discussed herein.

While the invention has been described above by reference to various embodiments, it should be understood that many advantages and modifications can be made without departing from the scope of the invention. It is therefore intended that the foregoing detailed description be regarded as illustrative rather than limiting, and that it be understood that it is the following claims, including all equivalents, that are intended to define the spirit and the scope of this invention.

We claim:

1. A method for adaptive rendering of computer assisted design data, the method comprising:
    storing, in a memory remote from a client computer, the computer assisted design data representing a three-dimensional structure;
    rendering, by a server remote from the client computer, a view of the three-dimensional structure using the computer assisted design data;
    transmitting the view to the client computer;
    adapting the rendering by the server as a function of bandwidth, capability of the client computer, or both the bandwidth and the capability of the client computer, wherein adapting the rendering comprises selecting between rendering the view as an image solely by the server and rendering the image in combination by the server and the client computer, the combination comprising the server rendering the image partially as the view of the three-dimensional structure and the client computer completing the rendering of the image such that the client computer has no access to the three-dimensional structure, the completing including only image space operations not relying on position information.

2. The method of claim 1 wherein storing comprises uploading the computer assisted design data as noiseless data of an engineered model.

3. The method of claim 1 wherein rendering the view comprises rendering a geometry represented by the computer assisted design data.

4. The method of claim 1 wherein rendering comprises rendering from a viewing direction received from the client computer and wherein transmitting comprises transmitting the view over a network.

5. The method of claim 1 wherein adapting comprises adapting as a function of the bandwidth of the server.

6. The method of claim 5 wherein adapting comprises adapting based on a number of renderings and corresponding client requests from different clients including the client computer.

7. The method of claim 1 wherein adapting comprises adapting as a function of the bandwidth of a network for the transmitting.

8. The method of claim 1 wherein adapting comprises selecting the rendering of the image in combination, the combination comprising the server rendering the view from geometry and the client computer performing a rendering operation on the view in an image space.

9. The method of claim 8 wherein the rendering operation on the view in the image space comprises a non-photorealistic rendering application.

10. The method of claim 1 wherein adapting comprises selecting the rendering the image in combination, the combination comprising the server providing coefficients and dictionary entries of a sparse dictionary to the client computer and the client computer assembling the view from the coefficients and the dictionary entries.

11. The method of claim 10 wherein the client computer accumulates the dictionary entries over time for different views including the view such that fewer coefficients are used to generate images from subsequent ones of the different views.

12. The method of claim 1 wherein transmitting the view comprises transmitting the view to the client computer and an additional client computer, the view transmitted to the client computer having a different compression than the view transmitted to the additional client computer.

13. A method for rendering of computer assisted design data, the method comprising:
    storing, in a memory remote from a client computer, the computer assisted design data representing a three-dimensional structure;
    rendering, by a server remote from the client computer, a view of the three-dimensional structure using the computer assisted design data;
    transmitting the view to the client computer;
    adapting the rendering by the server as a function of bandwith, capability of the client computer, or both the bandwith and the capability of the client computer, wherein adapting the rendering comprises selecting between rendering the view as an image solely by the server and rendering the image in combination by the server and the client computer;
    wherein adapting comprises selecting the rendering the image in combination, the combination comprising the server providing coefficients and dictionary entries of a sparse dictionary to the client computer and the client computer assembling the view from the coefficients and the dictionary entries.

14. The method of claim 13 wherein the client computer accumulates the dictionary entries over time for different views including the view such that fewer coefficients are used to generate images from subsequent ones of the different views.

* * * * *